United States Patent [19]

Jewell, II et al.

[11] Patent Number: 5,056,264
[45] Date of Patent: Oct. 15, 1991

[54] MOTOR VEHICLE DOOR ASSEMBLY WITH REINFORCEMENT PANEL

[75] Inventors: John H. Jewell, II, Denton, Tex.; Ross S. Sasamura, Honolulu, Hi.

[73] Assignee: Paccar Inc., Bellevue, Wash.

[21] Appl. No.: 461,365

[22] Filed: Jan. 5, 1990

[51] Int. Cl.⁵ .............................................. B60J 5/04
[52] U.S. Cl. ........................................ 49/502; 49/503
[58] Field of Search .................. 49/502, 503; 296/146

[56] References Cited

U.S. PATENT DOCUMENTS

| | | | |
|---|---|---|---|
| 2,650,857 | 9/1953 | Watter et al. | 49/502 |
| 3,713,691 | 1/1973 | Bayless | 49/502 X |
| 3,782,036 | 1/1974 | Clark et al. | 49/502 |
| 4,648,208 | 3/1987 | Baldamus et al. | 49/502 |
| 4,662,115 | 5/1987 | Ohya et al. | 49/502 |
| 4,743,062 | 5/1988 | McLaren et al. | 49/502 X |
| 4,785,585 | 11/1988 | Grier et al. | 49/502 |
| 4,876,825 | 10/1989 | Widrig et al. | 49/502 |

FOREIGN PATENT DOCUMENTS 243325  10/1987  European Pat. Off. .............. 49/502

OTHER PUBLICATIONS

Article in the Jul. 27, 1987 Issue of Automotive News at Page E26.

Primary Examiner—Gary L. Smith
Assistant Examiner—Michael Milano
Attorney, Agent, or Firm—Flehr, Hohbach, Test, Albritton & Herbert

[57] ABSTRACT

A door assembly for a truck including an outer door assembly, a reinforcement panel, and a door cover panel. The outer door assembly is made of a lightweight aluminum for weight savings, the reinforcement panel is made of a high strength steel to provide required strength and the added benefit of subassembly.

7 Claims, 4 Drawing Sheets

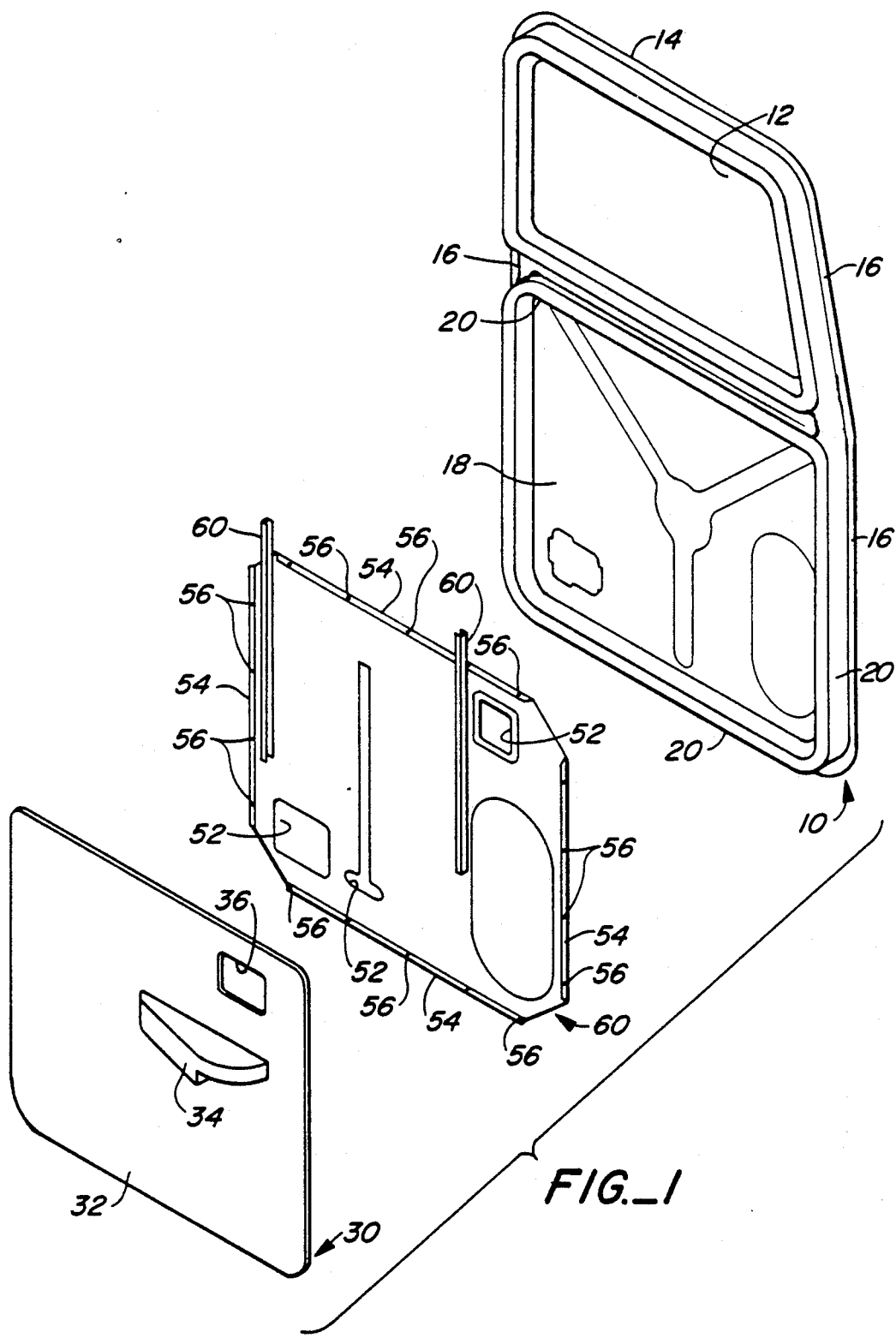
FIG._1

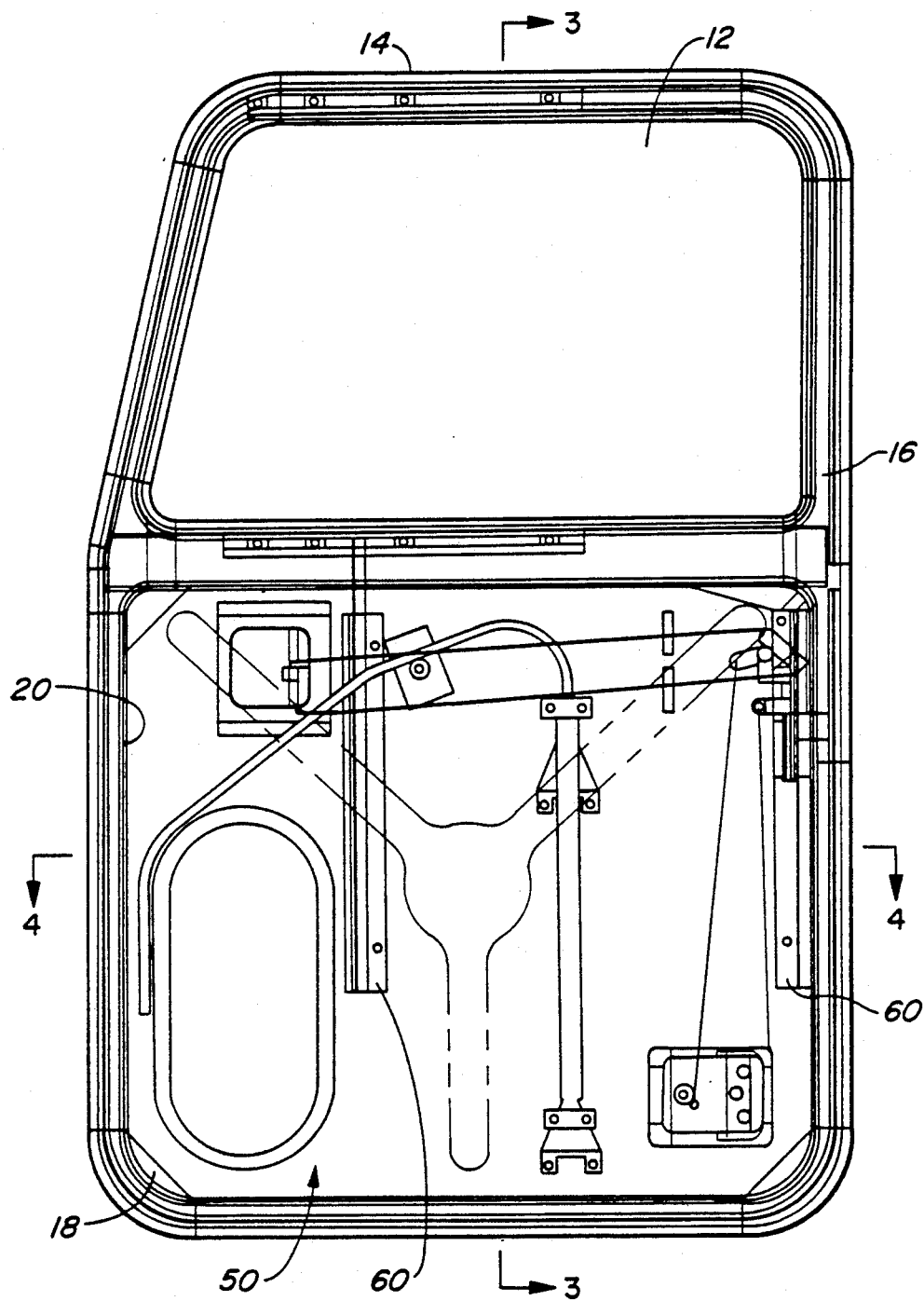
FIG._2

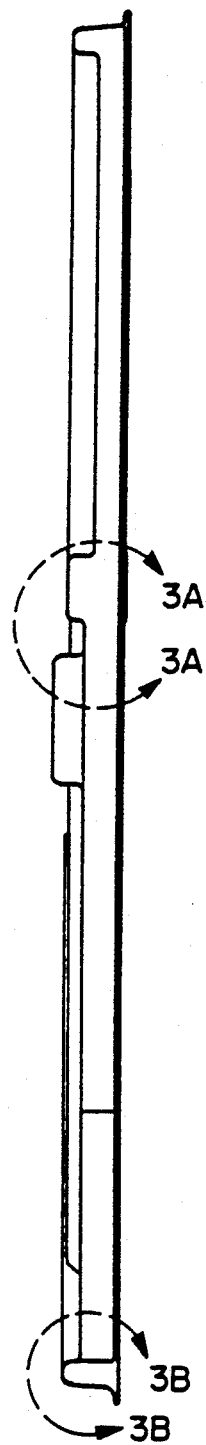
FIG._3
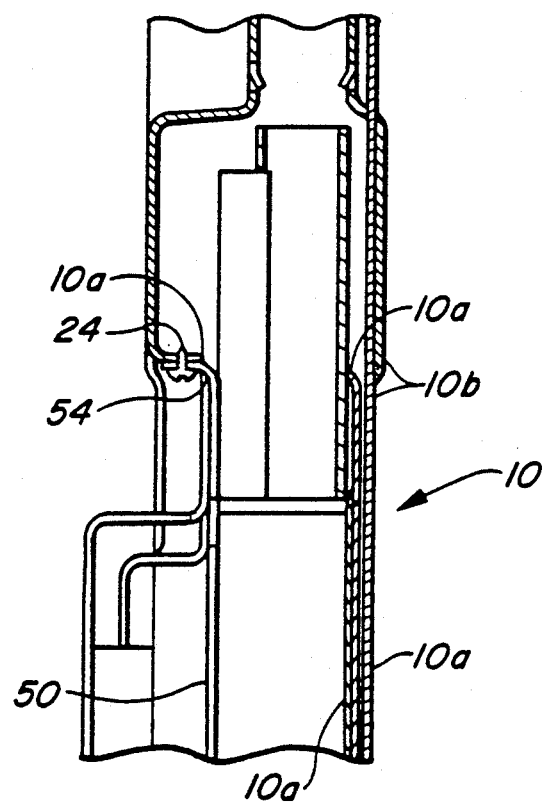
FIG._3A
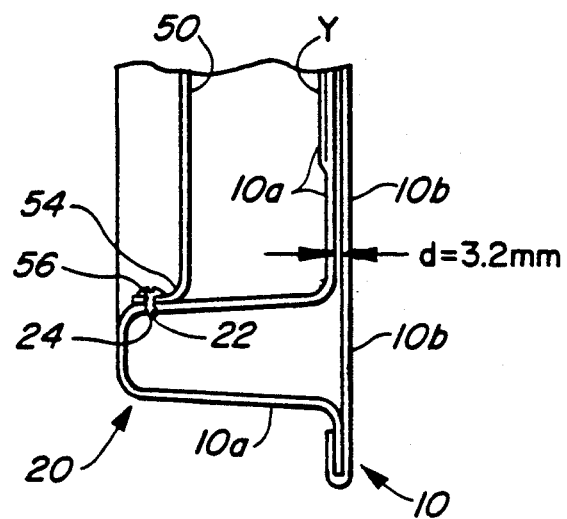
FIG._3B

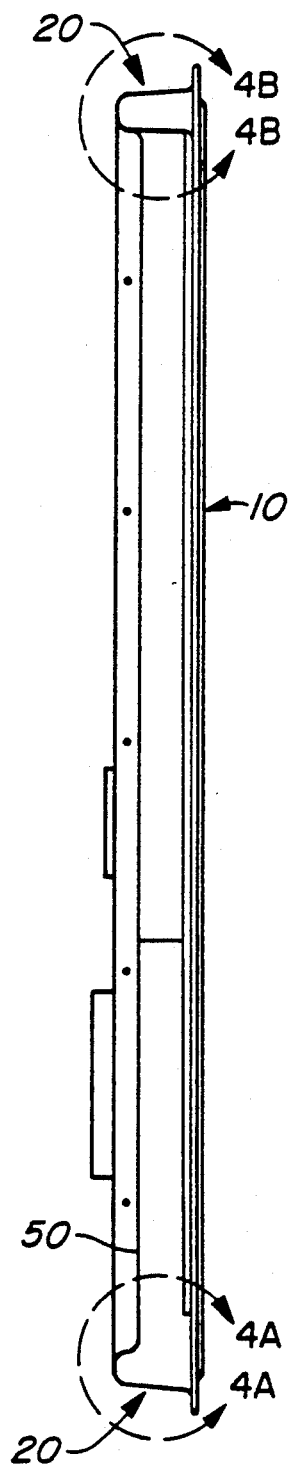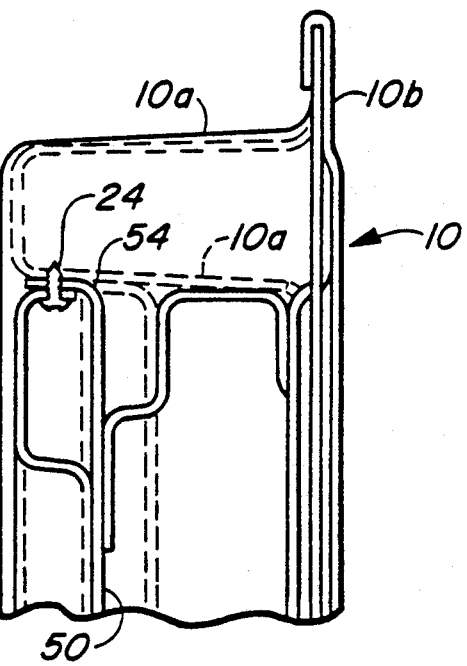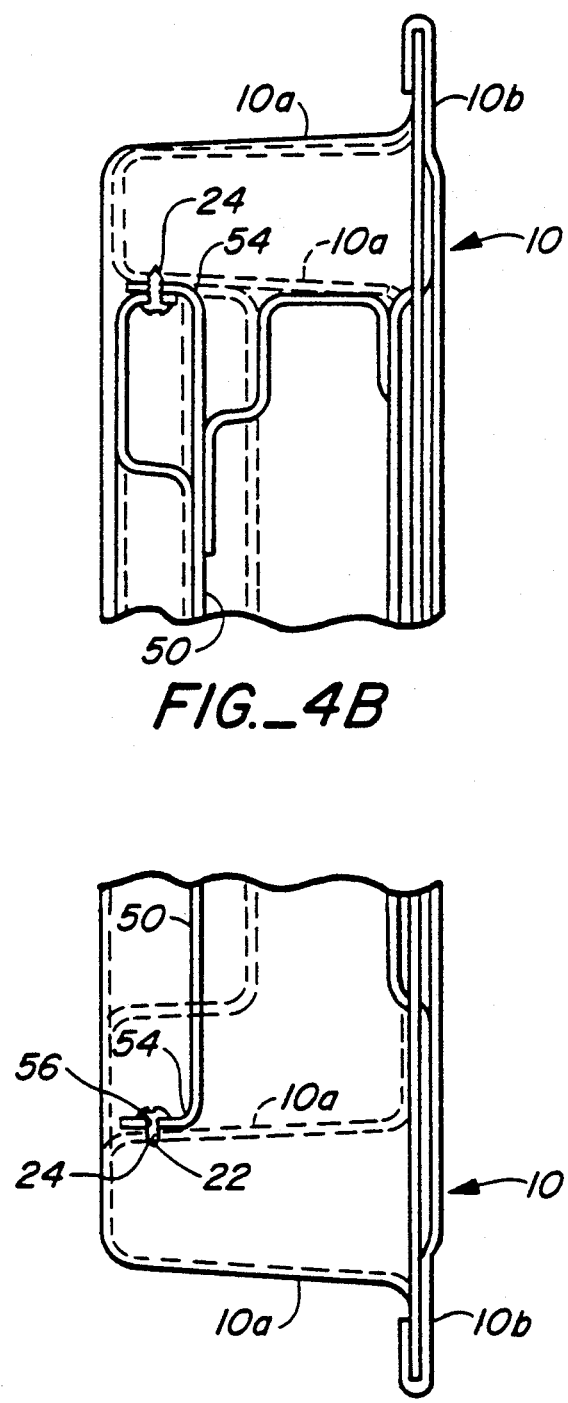
FIG._4
FIG._4B
FIG._4A

MOTOR VEHICLE DOOR ASSEMBLY WITH REINFORCEMENT PANEL

TECHNICAL FIELD

The present invention relates generally to a door assembly of the type which is hinged to the framework of motor vehicles, and relates more specifically to motor vehicle door assemblies of the type having an outer door panel attached to an inner door panel to form an interior area therebetween, and which are particularly suitable for use in heavy duty applications, such as in heavy duty truck cabs.

BACKGROUND ART

Motor vehicle door assemblies typically comprise an outer door panel, which defines the external contour of the door assembly, mounted along its peripheral edges to an inner door panel, which defines the internal contour of the door assembly, and upon which decorative interior panels are mounted forming portions of the motor vehicle interior. In situations where weight savings are critical (auto manufacturers prefer steel, weight is not as critical as it is for trucks) the inner and outer door panels typically comprise a moderate strength, lightweight metallic material, such as aluminum. A relatively large, hollow interior area is formed between the outer and inner panels, including a peripheral portion which mates with the motor vehicle door framework to seal the vehicle interior from the exterior and a central portion wherein various accessory mechanisms are mounted, such as window raising and lowering mechanisms, door latching and locking mechanisms, and the like. The inner panel is conventionally provided with openings to provide access to the interior area for assembly, adjustment, repair, or replacement of the various mechanisms mounted in the interior area. The access openings, however, regardless of their placement and dimension, provide only limited access to mechanisms mounted in the interior area between the inner and outer door panels, and assembly, adjustment, repair and replacement of the various mechanisms is inconvenient and time consuming.

All motor vehicle door assemblies must meet vehicle safety standards prescribed by the federal government. Conventional door assemblies having inner and outer panels defining a generally hollow interior area are not generally reinforced by higher strength materials (when weight is not a factor), so that the structural integrity and rigidity of the inner and outer door panels alone provides strength and rigidity to the door assembly. Providing door assemblies which exceed the prescribed vehicle safety standards is desirable to enhance vehicle and passenger safety. Moreover, vibration of the panels comprising conventional door assemblies and the accessory mechanisms mounted in the interior area often results in damage to the door panels and/or the mechanisms mounted therein.

Assembly of motor vehicle door panels and mounting of the mechanisms therein has typically taken place in a step-wise fashion which is time and labor intensive, and therefore costly. Recent efforts in the automotive industry have been directed to reducing costs, and particularly labor costs for assembly, maintenance and repair of motor vehicles. The use of modular assemblies which significantly reduce labor costs incurred in motor vehicle assembly, and significantly reduce the time required for motor vehicle assembly, has recently been recognized as an important factor in reducing motor vehicle assembly costs and improving productivity. An article in the July 27, 1987 issue of *Automotive News*, at page E26, describes the efforts of a major manufacturer to engineer and manufacture modular systems and subassemblies for the motor vehicle industry.

It is an object of the present invention to provide a door assembly using aluminum for structure and steel for reinforcement, realizing thereby a significant weight savings over the use of a complete steel door.

It is another objective of the present invention to provide a motor vehicle door assembly having safety features which increase the structural strength and rigidity of the door assembly and provide enhanced vehicle safety while reducing the weight of the complete door assembly.

It is another objective of the present invention to provide an improved motor vehicle door assembly which facilitates rapid motor vehicle assembly and which is especially suitable for use with sub-assembled accessory mechanisms.

It is another objective of the present invention to provide an improved motor vehicle door assembly which facilitates convenient access to various accessory mechanisms mounted on the door assembly for assembly, adjustment, repair, or replacement purposes.

It is still another objective of the present invention to provide a rigid reinforcement panel for installation on a door panel to increase the structural strength and rigidity of the door assembly, thereby enhancing vehicle safety.

It is a further objective of the present invention to provide an improved motor vehicle door assembly including a rigid reinforcement panel which reduces motor vehicle assembly costs, particularly labor costs, and which simultaneously reduces motor vehicle production times.

SUMMARY OF THE INVENTION

The improved motor vehicle door assembly of the present invention includes an outer and an inner door panel of lightweight material, with a rigid high strength reinforcement panel mounted on the interior surface of the outer door panel to provide improved structural strength and rigidity of the door assembly and to reduce weight. In the area around the periphery of the door assembly, the outer and inner door panels are contoured and joined to provide a standard door assembly peripheral configuration. The door assembly of the present invention may thus be installed in conventional motor vehicles without requiring any alteration of the framework. The door assembly of the present invention, however, is provided with a very shallow hollow interior area in the central area of the door assembly. This configuration of the outer and inner door panels permits construction of a fairly narrow door assembly, and facilitates installation of a rigid reinforcement panel in the central area of the door to significantly improve the structural strength and rigidity of the door assembly while reducing weight.

The reinforcement panel of the present invention preferably has a generally rectangular configuration and is preferably constructed from a high strength metallic material such as a high strength steel. The reinforcement panel is preferably mounted in the interior surface of the door assembly, and interior finishing panels may be mounted directly to the reinforcement panel. As already mentioned, the door assembly is typically made of a relatively lightweight metal, for example, aluminum. This results in improved strength with less weight. Due to the contour of the inner and outer panels according to the present invention and the narrowness of the central area of the door assembly, accessory mechanisms are preferably mounted on the interior surface of the reinforcement panel rather than in the interior space between the inner and outer panels. This feature of the present invention facilitates assembly and servicing of the accessory mechanisms, since full access to the mechanisms is provided upon removal of the interior finishing panel.

The foregoing objectives are accomplished in the vehicle door panel of the present invention. Labor costs may be significantly reduced by the subassembly of the door components to the reinforcement panel off-line, under controlled labor costs. Another benefit of the use of the reinforcement panel of the present invention is the increased reliability of the door. The quality control function is simplified because a smaller number of parts need be inspected. The added strength of the door due to the reinforcement panel should increase the door's life. The reduced weight of the door reduces the force required to open and close it, thus reducing wear and tear on the door assembly. Servicing of the door has been greatly simplified. The reinforcement panel facilitates the easy removal of defective parts. The panel is removed and the defective part replaced outside of the vehicle. The panel is then reinserted.

These and other features of the present invention are more easily understood with reference to the following figures.

DESCRIPTION OF THE DRAWINGS

FIG. 1 is an exploded view of the assembly of the present invention, with the cover panel and the reinforcement panel removed from the outer door assembly for easier analysis.

FIG. 2 is a view of the assembly of FIG. 1, with the reinforcement panel in place, but without the cover panel.

FIG. 3 is a vertical section view of the assembly of FIG. 2 taken along the line 3—3.

FIG 3A is an enlarged, fragmentary, cross section view of substantially the area bounded by line 3A—3A in FIG. 3.

FIG. 3B is an enlarged, fragmentary, cross section view of substantially the area bounded by line 3B—3B in FIG. 3.

FIG. 4 is a horizontal section view of the assembly of FIG. 2 taken along the line 4—4.

FIG. 4A is an enlarged, fragmentary cross section view of substantially the area bounded by line 4A—4A in FIG. 4.

FIG. 4B is an enlarged, fragmentary cross section view of substantially the area bounded by line 4B—4B in FIG. 4.

DETAILED DESCRIPTION OF THE DRAWINGS

Referring to FIG. 1, there is shown in exploded perspective view the motor vehicle door assembly of the present invention comprising a outer door assembly, generally designated 10, an door cover panel, generally designated 30, and a reinforcement panel, generally designated 50. Outer door assembly 10 comprises a typical outer door of a motor vehicle having a window opening, 12, in its upper portion, a peripheral edge, 14, defining the external surface of the door, an internally flanged edge 16 constant around entire circumference of the door and an external panel 18 in its lower portion.

Door panel 30 typically comprises a panel generally made from cardboard having an internally directed major face covered by a cloth or plastic material, 32, giving an eye-pleasing appearance to the interior of the motor vehicle. Accessories are attached to this panel, for example, arm rest 34, and holes, for example, at 36, are provided for other accessories mounted to reinforcement panel 50 to extend through. The inner door panel, 30, may be snapped into place, once reinforcement panel 50 is mounted to the door panel 10. Such mounting can be accomplished in a manner already known in the art; hence instruction herein is unnecessary.

Reinforcement panel 50 comprises a generally rectangular rigid panel disposed between external panel 18 and door corer panel 30. It is preferably constructed from a relatively high strength metallic material, such as high strength steel to provide required strength. Reinforcement panel 50, as well as external panel 18 and door cover panel 30 have their major faces disposed in substantially parallel relation to each other, as best seen in FIG. 1. Reinforcement panel 50 is further formed with a variety of preselected cutouts, 52, to receive and retain various accessory mechanisms which operate door accessories, for example, the interior door handle (latch mechanism), and the window machinery, and other accessories for the vehicle in general such as power windows, window regulator door latch and handles. Panel 50 is similarly formed to receive other door hardware which is mounted thereon. Specifically, the pair of channel-shaped metal braces 60 can be mounted on the inwardly disposed major face of panel 50 such that the open edge of the channels face each other. The metal braces 60 are typically known as the "run channel" and they support and guide the door window glass. They are illustrated in FIG. 1.

Referring to FIG. 3, the outer door assembly 10 is comprised of flanged inner door panel 10a hemmed and bonded to a relatively flat outer panel 10b. Both panels 10a and 10b are made of aluminum for strength and to be light-weight. There is a gap between panels 10a and 10b of about 3.2 millimeter as designated by d. The gap provides an improved strength of assembly.

Referring again to FIG. 1, the reinforcement panel 50 is attached to outer door assembly 10 in the following manner. Reinforcement panel 50 is formed with integral, internally disposed, flanged edges 54 substantially about each of the four sides of the panel. At the corners, such flanges are unnecessary as can be seen from FIG. 1. Flanged edges 54 of reinforcement panel 50 correspond to the internally disposed flanged portion 20 of outer door panel 18. Flange portion 20 is substantially contiguous with flange edges 54 of reinforcement panel 50 such that reinforcement panel 50 can easily be inserted into door assembly 10 after all the hardware or accessories have been added thereto. The two contiguous flanged edges 20 and 54 can be coupled together by various means.

Preferably as shown in FIG. 1, edges 20 and 54 are coupled together by means of a plurality of mated openings 56 and 22 (see FIGS. 3-4) in flanged edges 54 and 20 respectively such that fasteners 24 can be inserted therethrough to secure reinforcement panel 50 to outer door assembly 10, as shown in FIGS. 3 and 4. In the embodiment shown in these figures, fastener 24 comprises threaded bolts but other types of fasteners may be used as well.

While the foregoing detailed description provides a full and complete description of the preferred embodiments of the invention, various modifications, alternate constructions, and equivalents may be employed without departing from the scope of the invention. Accordingly, the foregoing description and illustrations should not be construed as limiting the scope of the invention, defined by the following claims.

What is claimed is:

1. In a motor vehicle door including an outer door panel assembly having a window opening in an upper portion thereof, a reinforcing panel mounted to said outer door panel assembly below said window opening and in substantially parallel face-to-face relation to a lower portion of said outer door panel assembly, and an inner door cover panel mounted to said vehicle door in substantially parallel face-to-face relation to said reinforcing panel, the improvement in said vehicle door comprising:

said outer door panel assembly including an outer door sheet and an inner door sheet secured together in face-to-face relation and having a common periphery, said inner door sheet being formed proximate said common periphery with an inwardly protruding channel having a U-shaped transverse cross section, said outer door sheet being secured and extending across the mouth of said U-shaped channel of said inner door sheet to form with said inner sheet a reinforcing edge structure having a hollow box-like transverse cross section, and said reinforcing edge structure extending substantially around the entire common periphery of said outer door panel assembly; and said reinforcing panel extending between opposed portions of said reinforcing edge structure and being secured to said outer door panel assembly to reinforce said vehicle door between said opposed portions of said reinforcing edge structure.

2. The motor vehicle door as defined in claim 1 wherein, said inner door sheet is formed with a U-shaped channel and said outer door sheet extends across said U-shaped channel to form a reinforcing edge structure extending transversely across said vehicle door immediately below said window opening; and said reinforcing panel is secured to said outer door panel assembly and extends between portions of said reinforcing edge structure on opposed sides of said vehicle door and between opposed portions of said reinforcing edge structure below said window opening and at a bottom of said vehicle door.

3. The motor vehicle door as defined in claim 1 wherein, said reinforcing panel is formed with an inwardly protruding flange along substantially the entire periphery of said reinforcing panel, and said reinforcing panel is removably mounted to said outer door panel assembly by releasable securement of said inwardly protruding flange on said reinforcing panel to said reinforcing edge structure on said outer door panel assembly.

4. The motor vehicle door as defined in claim 1 wherein, said inner door sheet and said outer door sheet are secured together to form said outer door panel assembly in slightly spaced apart relation to increase the resistance of said outer door panel assembly to bending moments.

5. The motor vehicle door as defined in claim 1 wherein, said inner door sheet is integrally formed with a transversely extending reinforcing rib.

6. The motor vehicle door as defined in claim 1, and accessory mechanisms for operating said vehicle door mounted to and supported on said reinforcing panel.

7. The motor vehicle door as defined in claim 1 wherein, said outer door sheet and said inner door sheet are both formed on an aluminum alloy material, said reinforcing panel is formed of a steel alloy material.

* * * * *